US008352696B2

(12) United States Patent
Hampel

(10) Patent No.: US 8,352,696 B2
(45) Date of Patent: Jan. 8, 2013

(54) INTEGRATED CIRCUIT WITH BI-MODAL DATA STROBE

(75) Inventor: Craig E. Hampel, San Jose, CA (US)

(73) Assignee: Rambus Inc., Sunnyvale, CA (US)

(*) Notice: Subject to any disclaimer, the term of this patent is extended or adjusted under 35 U.S.C. 154(b) by 842 days.

(21) Appl. No.: 12/103,640

(22) Filed: Apr. 15, 2008

(65) Prior Publication Data

US 2008/0195885 A1   Aug. 14, 2008

Related U.S. Application Data

(63) Continuation of application No. 10/676,648, filed on Sep. 30, 2003, now abandoned.

(51) Int. Cl.
*G06F 1/12* (2006.01)
(52) U.S. Cl. .................. 711/167; 713/600
(58) Field of Classification Search .......... 711/167; 713/600
See application file for complete search history.

(56) References Cited

U.S. PATENT DOCUMENTS

| | | | | |
|---|---|---|---|---|
| 5,857,095 A * | 1/1999 | Jeddeloh et al. | ............. | 713/401 |
| 5,893,136 A * | 4/1999 | Stolt et al. | ............. | 711/105 |
| 6,075,393 A | 6/2000 | Tomita et al. | ............. | 327/153 |
| 6,085,285 A * | 7/2000 | Lucas et al. | ............. | 711/112 |
| 6,188,638 B1 | 2/2001 | Kuhne | ............. | 365/233 |
| 6,397,312 B1 | 5/2002 | Nakano et al. | ............. | 711/167 |
| 6,487,647 B1 * | 11/2002 | Samson | ............. | 711/167 |
| 6,502,173 B1 | 12/2002 | Aleksic et al. | ............. | 711/168 |
| 6,618,319 B2 | 9/2003 | Ooishi et al. | ............. | 365/233 |
| 6,621,496 B1 | 9/2003 | Ryan | ............. | 345/533 |
| 7,062,625 B1 * | 6/2006 | Shrader et al. | ............. | 711/167 |
| 7,134,960 B1 | 11/2006 | Shimizu et al. | ............. | 463/36 |
| 2001/0054135 A1 | 12/2001 | Matsuda | ............. | 711/167 |
| 2002/0144173 A1 * | 10/2002 | Jeddeloh | ............. | 713/501 |
| 2003/0026161 A1 | 2/2003 | Yamaguchi et al. | ............. | 365/230.03 |
| 2003/0065877 A1 * | 4/2003 | Gillingham et al. | ............. | 711/104 |
| 2003/0070052 A1 * | 4/2003 | Lai | ............. | 711/167 |
| 2003/0196032 A1 * | 10/2003 | Dong | ............. | 711/105 |
| 2004/0003194 A1 * | 1/2004 | Bodas et al. | ............. | 711/167 |
| 2004/0255077 A1 * | 12/2004 | Ryan | ............. | 711/105 |
| 2005/0018494 A1 | 1/2005 | Wu et al. | ............. | 365/193 |

FOREIGN PATENT DOCUMENTS

| | | |
|---|---|---|
| JP | 2005-044494 | 2/2005 |
| WO | WO 01/29680 A1 | 4/2001 |
| WO | WO 01/29680 C2 | 4/2001 |
| WO | WO 2008/115968 A1 | 9/2008 |

OTHER PUBLICATIONS

Notice of Opposition to European Patent No. 1 668 523, granted Jul. 18, 2007. Opposed by Micron Europe Ltd.

(Continued)

*Primary Examiner* — Hal Schnee
(74) *Attorney, Agent, or Firm* — Morgan, Lewis & Bockius LLP

(57) ABSTRACT

A memory device that has two operating modes. In the first mode the data strobe is source synchronous and is driven by the memory device when data is being transmitted. In the second mode the data strobe is not driven by the memory device. In this mode the data strobe signal is used as a free running clock to sample write data. The capture of read data by the controller is timed by a controller with a calibrated internal timing reference from the system clock.

46 Claims, 5 Drawing Sheets

OTHER PUBLICATIONS

Park et al., "High-Speed Signaling in SDARM Bus Interface Channels:Review," Journal of Semiconductor Technology and Science, vol. 1, No. 1, Mar. 2001.
Sidiropoulos, S., "High Performance Inter-Chip Signalling," 138 pages.
International Search Report for PCT/US2004/029186 dated Dec. 27, 2004, 3 pgs.
Observations on the Notice of Opposition of Micron Ltd. EP 1668523 dated Dec. 8, 2008, 28 pgs.
JP Office Action with mail date of Dec. 9, 2010 re JP Application No. 2006-533897. 9 Pages (with translation).
KR Office Action dated Jan. 26, 2011 re KR Application No. 10-2006-7008404. 2 Pages.
KR Office Action dated Jan. 26, 2011 re KR Application No. 10-2006-7008404. 5 Pages.
JP Response dated Mar. 8, 2011 to the Office Action re JP Application No. 2006-533897. 14 Pages.
JP Amendment dated Mar. 23, 2011 re JP Application No. 2011-050556. includes Request for Examination. 9 pages.
KR Response dated Mar. 25, 2011 to the Examiner's Preliminary Rejection re KR Application No. 10-2006-7008404. 26 Pages.
KR Office Action dated May 16, 2011 re Preliminary Rejection in KR Application No. 10-2011-7006938. 6 Pages.
KR Response dated Jul. 14, 2011 to the Office Action dated May 16, 2011 re Preliminary Rejection in KR Application No. 10-2011-7006938. 12 Pages.

* cited by examiner

INTEGRATED CIRCUIT WITH BI-MODAL DATA STROBE

RELATED APPLICATIONS

This application is a continuation of and claims priority to U.S. patent application Ser. No. 10/676,648 filed Sep. 30, 2003 now abandoned, the disclosure of which is incorporated by reference herein.

BRIEF DESCRIPTION OF THE INVENTION

The present invention pertains generally to integrated circuit technologies. More specifically, the present invention pertains to integrated circuit devices with bi-modal data strobes.

BACKGROUND

A source synchronous data strobe serves to compensate for the delays in the transmit path of a device that is transmitting data and the receive path of a device receiving this data. The size of these delays are a function of the speed, and variation in path speed, of a semiconductor device over its operating conditions and manufacturing tolerances.

Typically the data strobe interconnect lines between devices are left in a tristate, or quiet state, when responsibility for generating a data strobe is transferred from one device to another. As a result of these quiet periods, the data strobe does not have a predetermined, constant frequency, but resembles a clock being briefly turned on and off. During periods that multiple cycles of the data strobe are generated by a single device, the data strobe signal suffers from standing wave phenomena. The first edge, and perhaps the first few edges of a data strobe will typically arrive in-phase with respect to the data. However, subsequent edges of the data strobe may shift due to reflections of previous data strobe edges, and therefore will not be in phase with respect to the data. In other words, the data strobe would begin to appear more like a free running clock.

As memory bus speeds have increased, the benefits of using source synchronous data strobes in memory systems have decreased. Over time it is apparent that data strobes will need to be modified to accommodate systems that run faster. Due to manufacturing costs and economies of scale, it would be beneficial if a new system design that addresses the problems with data strobes were compatible with products using source synchronous data strobes.

SUMMARY

A controller for a memory system is coupled to a data strobe bus, a data bus, and a clock bus. The controller includes an output buffer configured to assert a first data strobe signal on the data strobe bus when the output buffer is enabled. The controller also includes a register to store a mode of controller operation. The output buffer is enabled only during transfers from the controller of a first data signal over the data bus when the mode of controller operation is set to a first mode of controller operation. The output buffer is, however, continuously enabled when the mode of controller operation is set to a second mode of controller operation. Further, the controller is configured to receive a clock signal over the clock bus and to clock receipt of a second data signal over the data bus with the clock signal.

In another aspect, a memory device is coupled to a data strobe bus, a data bus, and a clock bus. The memory device is configured to receive over the data strobe bus a data strobe signal that is continuously, remotely asserted on the data strobe bus. The memory device is also configured to receive over the data bus a first data signal in conjunction with the data strobe signal and to clock receipt of the first data signal with the data strobe signal. The memory device is further configured to receive a clock signal over the clock bus. In a first mode of operation, the memory device is configured to transmit over the data bus a second data signal in conjunction with the clock signal and to clock transmission of the second data signal with the clock signal. In a second mode of operation the memory device is configured to clock transmission of the second data signal with the data strobe signal.

BRIEF DESCRIPTION OF THE DRAWINGS

Aspects of the present invention will be more readily apparent from the following description and appended claims when taken in conjunction with the accompanying drawings, in which:

DESCRIPTION OF EMBODIMENTS

A number of embodiments of the invention are described below. In the interest of clarity, not all features of an actual implementation are described. It will be appreciated that in the development of any such embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
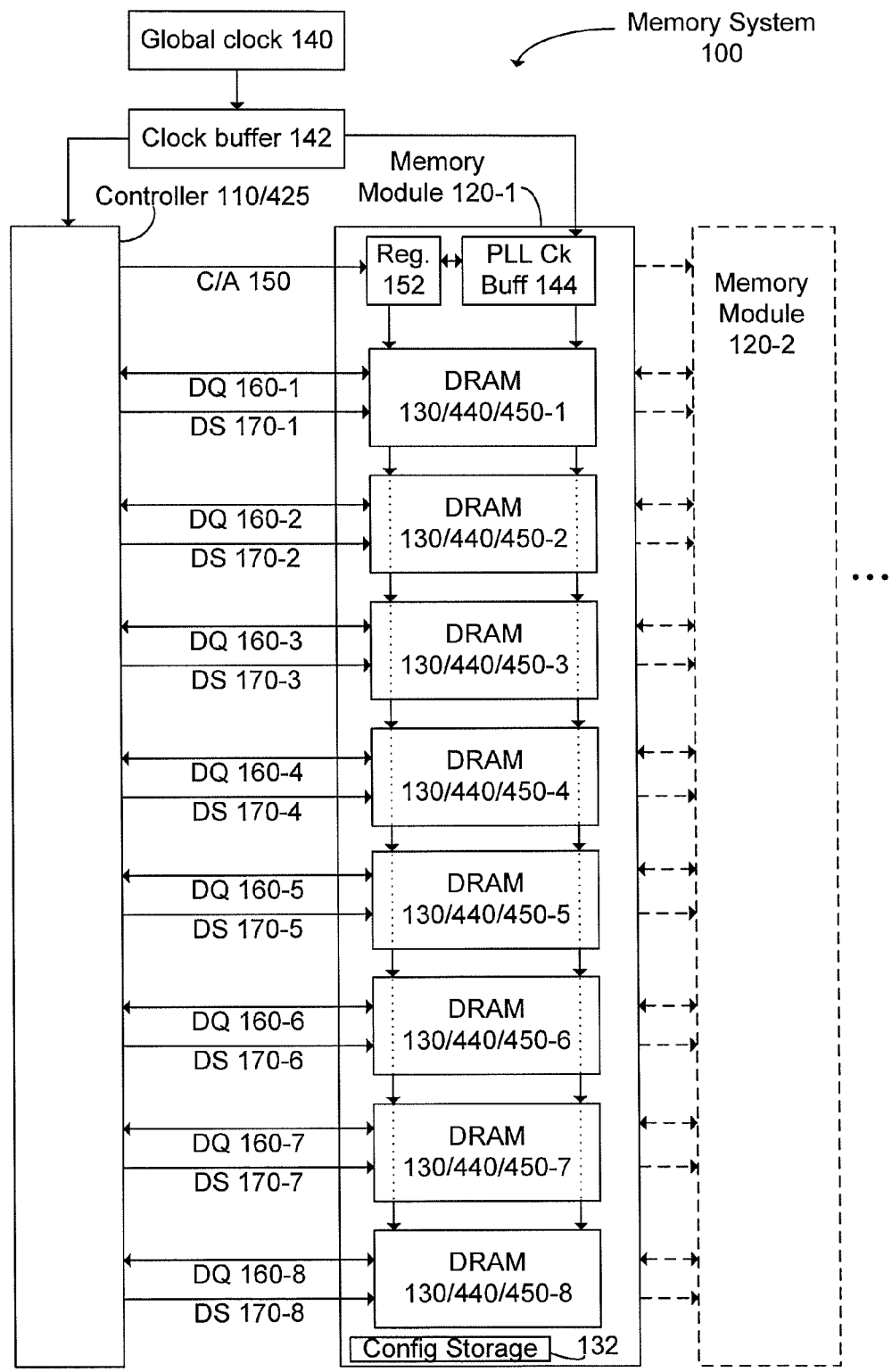
FIG. 1 illustrates a memory system.

FIG. 1 illustrates a memory system 100 that includes a master system clock or global clock 140, a clock buffer 142, a controller 110/425, one or more memory modules 120 (120-1, 120-2), one or more control and address ("C/A") leads 150, eight data ("DQ") leads 160 (160-1 to 160-8) and eight data strobe ("DS") leads 170 (170-1 to 170-8). The memory module 120-1 in some embodiments is a DIMM (dual in-line memory module) that includes eight DRAMs 130/440/450 (130-1 to 130-8), and a configuration storage device 132. While the memory module 120-1 shown in FIG. 1 has a single column of DRAMs, one or more of the memory modules in the system 100 may be a multi-rank memory module having two or more columns (also called ranks) of DRAMs. In such memory modules, a single column or rank of the DRAMs is accessed during each memory operation that employs the memory module. Each memory module 120 optionally includes a register 152, a phase locked loop ("PLL") clock buffer 144. These optional support circuits are helpful, for instance, in systems supporting large fan-outs (i.e., large numbers of DRAMs). In particular, these optional circuits support the distribution of clock, control and address signals among the DRAMs 130.

In some embodiments, the memory module configuration storage device 132 (sometimes called a mode register or configuration register) is implemented as a serial presence detect (SPD) device such as a PROM (programmable read only memory). The configuration storage device 132 is typically read by the controller upon power up or system reset to determine the capabilities and/or configuration of the memory module 120. In some embodiments, a bit within the memory module configuration storage device 132 stores a data strobe mode value (also herein called a directional mode value), indicative of whether the memory devices within the memory module can be configured to disable driving of the data strobe, in addition to other mode values. The information read from the memory module configuration storage device 132 is used by the controller 110 to set mode bits within the controller 110 and the DRAMs 130. In some embodiments the number of data leads, data strobes and DRAMs may be larger or smaller. Except where otherwise noted, discussions provided here with respect to controller 110 are also applicable to controller 425, and discussions with respect to DRAM 130 are also applicable to DRAMs 440 and 450.

The C/A leads 150 function as a control and address bus, having as many parallel signal paths as needed by the memory system 100. Similarly, each of the DQ leads 160 function as a data bus, having as many parallel signal paths (or as few as one signal path) as needed by the memory system 100. When the memory system 100 has two or more memory modules, the C/A leads 150, DQ leads 160 and DS leads 170 connect the controller 110 to each of the memory modules.

In some embodiments, the DS leads 170 transmit data strobes that act as source synchronous bi-directional timing references. The set of leads 150, 160, 170 interconnecting the controller 110/425 and the memory module 120 are sometimes collectively called a memory bus or, more generally, an interconnect. The DS leads 170 separately connect the controller 110 to each DRAM 130 in the memory module 120. When the controller 110 transmits data to a DRAM 130 over a given DQ lead 160, the transmission and receipt of the data is clocked by the data strobe transmitted by the controller 110 over a corresponding DS lead 170. Similarly, in some embodiments, when a DRAM 130 transmits data to the controller 110 over a given DQ lead 160, the transmission and receipt of the data is clocked by the data strobe transmitted by the DRAM 130 over a corresponding DS lead 170.

In other embodiments, the DS leads 170 in the memory system 100 are configured to operate in a unidirectional manner. More specifically, data strobes transmitted by the DS leads 170 are unidirectional—generated and transmitted by the controller 110 only. The DRAMs 130, therefore, may receive a data strobe but not generate and transmit a data strobe. In these embodiments, when a DRAM 130 transmits data to the controller 110 over a given DQ lead 160, the transmission and receipt of the data is clocked by the clock signal received from the clock buffer 142.

As described in more detail below, the memory system 100 includes a controller 110 and a DRAM 130 that may be configured to operate in conjunction with DS leads 170 that are bidirectional or unidirectional. The embodiments described here are not limited to a controller 110 and/or a DRAM 130 that operate in a unidirectional manner. A single part (e.g., a controller 110, DRAM 130/440/450, or memory module 120) may be configurable so as to satisfy past, present, and future needs of the memory system market. In other words, these devices are capable of providing improved performance while also maintaining backwards compatibility.

Though not illustrated, the controller 110 (sometimes called a memory controller) preferably sends and receives data to and from external components (i.e., components not illustrated in FIG. 1). Additionally, the controller 110 sends and receives this same data to and from the memory module 120, which stores this data, via the DQ leads 160. More specifically, each of the DQ leads 160 connects the controller 110 to a DRAM 130 within the memory module 120. And as illustrated in FIG. 1, the DQ leads 160 are bi-directional. More specifically, the controller 110 transmits data to and receives data from the DRAMs 130 via the DQ leads 160.

The controller 110 controls the operation of the memory module 120, and thus the DRAMs 130, via the C/A lead 150, with control and address signals. These signals enable the controller 110 to select one of possibly two or more memory modules 120 to which the controller 110 is coupled. The memory module 120 is configured to receive over the control and address bus 150 control and address signals in conjunction with the clock signal asserted on the clock bus, the clock signal clocking receipt of the control and address signals. The transmission of the control and address signals to the DRAMs 130 is synchronous and operates in parallel with the synchronous transmission of data signals over the DQ leads 160.

The global clock 140 generates a clock (sometimes called the system clock or reference clock) that is transmitted to the clock buffer 142, which drives the clock to the controller 110 and the memory module 120. The clock buffer is typically PLL based in order to phase align the clock. Other bus structures for distributing the system or reference clock may be used, such as the configuration shown in U.S. Pat. No. 5,485,490, which is hereby incorporated by reference. Within the memory module 120, a PLL clock buffer 144 receives the clock from the clock buffer 142. The PLL clock buffer 144 aligns the phase of the module clock (used internally within the memory module) with the received reference clock, and transmits the module clock to the register 152 and the DRAMs 130. The transfer of data and control signals to the memory module 120 is thus synchronous to the clock generated by the global clock 140.

Controller with Directional Mode Control

Figure 2:
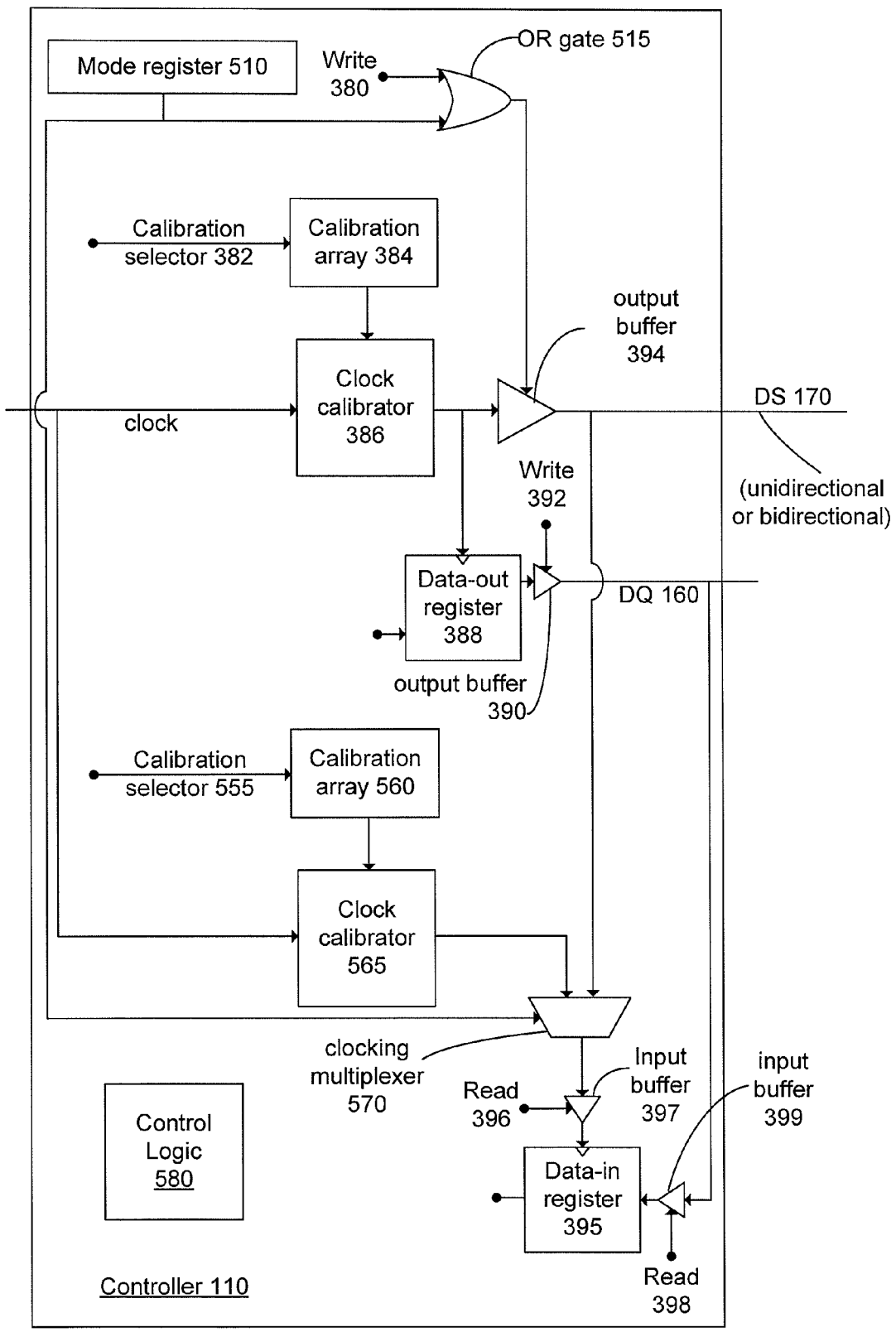
FIG. 2 illustrates a controller of the memory system illustrated in FIG. 1.

FIG. 2 illustrates a controller 110 of the memory system 100 in greater detail. It is noted that FIG. 2 is a conceptual representation of a small subset of the components of a typical controller. The controller 110 includes a write indicator 380, a data-out register 388, an output buffer 390, another write indicator 392, an output buffer 394, a data-in register 395, a read indicator 396, an input buffer 397, another read indicator 398, and an input buffer 399. In some implementations, the two read indicators 396, 398 are the same read control signal, and the two write indicators 380, 392 are the same write control signal.

In some embodiments, the controller further includes a calibration selector 382, a calibration array 384, a clock calibrator 386, while in other embodiments these elements are not included. In those embodiments in which these elements are not include, the clock from the clock buffer 142 is coupled to the output buffer 394.

The controller 110 also includes a mode register 510, an OR gate 515, a calibration selector 555, a calibration array 560, a clock calibrator 565, and a clocking multiplexor 570. Additional control logic 580 generates the control signals shown in FIG. 2, and also performs control functions of the controller 110 that are not relevant to the present discussion. The mode register 510 stores a directional mode. Generally, this mode determines whether the DS leads 170 are unidirectional or bidirectional. The mode register 510 may preferably be set during operation of the controller 110 by one or more external components (not illustrated) or during the manufacture of the controller 110. The directional mode stored by the mode register 510 is transmitted to the OR gate 515 and to the clocking multiplexor 570.

The OR gate 515, as indicated in the preceding paragraph, receives input from the mode register 510. The OR gate 515 also receives input from the write indicator 380. The output of the OR gate 515 is, therefore, high if either the directional mode is high or the write indicator 380 is high. Preferably, the write indicator 380 is high when the controller 110 writes data to a DRAM, and the directional mode is high when the controller 110 is configured to operate in a unidirectional mode (regardless of whether the controller 110 is writing data, reading data, or is otherwise inactive). The output of the OR gate 515 is connected to the output buffer 394 to enable or disable the output buffer 394. So when the controller 110 writes data to a DRAM or when the controller 110 is configured to operate in a unidirectional mode, the output buffer 394 is enabled. When the output buffer 394 is not enabled, its output is tristated (i.e., set to a high impedance state), which leaves the DS lead 170 floating if no other device is asserting a signal on the DS lead, and more generally allows the DS lead 170 to be driven by another device (e.g., a memory device in a memory module).

As indicated above, the controller 110 sets the write indicator 380 to enable the output of the output buffer 394 when transmitting data to a DRAM 130. Additionally, the controller 110 stores calibration data for each memory module 120 to which the controller 110 is connected. In the memory systems illustrated in the present application, only one memory module 120 is shown. Memory systems, however, may include more than one memory module 120. The various connections of the controller 110 to the memory modules 120 may be different. For example, the length and impedance of such connections may vary. As a result, the timing signals (e.g., clock or data strobe) may be calibrated or adjusted.

As noted above, in some embodiments, the controller includes a calibration selector 382, a calibration array 384, a clock calibrator 386 for adjusting the timing signals used when writing data to a memory device. The calibration array 384 stores calibration data for this purpose. The calibration selector 382 carries a signal generated by the controller 110 that selects a specific calibration based upon which memory module 120 is being written to by the controller 110. The calibration selector 382 may transmit, for example, an address to select a specific calibration value stored by the calibration array 384.

The selected calibration value is transmitted by the calibration array 384 to the clock calibrator 386, which also receives a clock from the clock buffer 142. The clock calibrator 386 uses the selected calibration value to adjust the phase of the clock received thereby. In some embodiments each stored calibration value specifies a delay to offset state transitions of the clock signal. In some embodiments the stored calibration values each specify a clock phase. The adjusted clock is the basis of a data strobe generated by the controller 110. This data strobe is transmitted by the clock calibrator 386 to the data-out register 388 and to the output buffer 394. As indicated above, the output buffer 394 transmits the data strobe to a DS lead 170. The data strobe clocks the output of data from the data-out register 388 to the output buffer 390, which is connected to the DQ lead 160 and enabled by the write indicator 392.

In one mode of operation, the data-in register 395 of the controller 110 receives a data strobe from the input buffer 397 and data from the input buffer 399. The input buffer 397 is enabled by the read indicator 396 and the input buffer 399 is enabled by the read indicator 398. The input buffer 397 receives input (i.e., a data strobe) from the DS lead 170 and the input buffer 399 receives input (i.e., data) from the DQ lead 160. The control logic 580 controller 110 sets the read indicators 396, 398 to enable the input buffers 397, 399 when receiving data from a DRAM 130. The received data strobe, therefore, clocks the receipt of the data.

When the controller 110 is configured to use the DS leads in a bidirectional manner, the data strobe is source synchronous and is driven by a DRAM while the DRAM transmits data. In this mode, the controller 110 is compatible with conventional DRAM (e.g., DRAM 130) memory modules. But when the controller is configured to use the DS leads 170 in a unidirectional manner, the data strobe is not source synchronous and is not driven by a DRAM. In this mode the data strobe may be used by a DRAM as a free running clock to sample data transmitted by the controller 110.

As described above, the memory module 120 includes a plurality of DRAMs 130. Accordingly, the controller 110 may include (though not illustrated for simplicity) a data-out register 388 for each DRAM 130 within the memory module 120. The output of the clock calibrator 386 is connected to each of the data-out registers 388. Additionally, an output buffer 390, which is in turn connected to a respective DQ lead 160, is included for each data-out register 388. The write indicator 392 is preferably connected to each of these data-out registers 388 so that the output of each data-out register 388 is clocked by the same data strobe and enabled by the same write indicator 392. Additionally, an output buffer 394 is included for each DRAM 130 within the memory module 120. The output of the clock calibrator 386 is connected to each of the data-output buffers 394, which are in turn connected to a respective DS lead 170. This configuration enables the controller to transmit separate data to each DRAM 130 of a memory module 120 simultaneously.

A given calibration value, therefore, applies to each of the data-out registers 388 simultaneously clocked by the data strobe. Each set of DS 170 and DQ leads 160 connected to a given set of output buffers 390, 394 may also be connected to more than one memory module 120. Calibration values, therefore, are typically derived for each memory module 120, not each DRAM 130 within a memory module 120. When a specific memory module 120 is selected, this selection is reflected in the control and address signals transmitted to each memory module 120 in order to set the selected memory module 120 to receive data.

Similarly, the controller 110 may include (though not illustrated for simplicity) a data-in register 395, input buffer 397, and input buffer 399 for each DRAM 130 within the memory module 120 (i.e., each set of DS 170 and DQ leads 160). This configuration enables the controller to receive separate data from each DRAM 130 of a memory module 120 simultaneously. When a specific memory module 120 is selected to transmit data to the controller, only this memory module 120 puts data and a data strobe on the DQ 160 and DS leads 170, respectively.

The calibration selector 555 carries a signal generated by the control logic 580 of controller 110 depending on which memory module is being read from by the controller 110 (i.e., depending on which memory module is transmitting data over the DQ lead 160 to the controller 110). The calibration selector 555 may transmit an address to select a specific calibration value stored by the calibration array 560.

The selected calibration value is transmitted by the calibration array 560 to the clock calibrator 565, which also receives a clock from the clock buffer 142. The clock calibrator 565 uses the selected calibration value to adjust the phase of the clock received thereby. The adjusted clock is transmitted by the clock calibrator 565 to the clocking multiplexor 570. It should be noted that the calibration selector 555, calibration array 560 and clock calibrator 565 are used only when the directional mode is unidirectional, and are used to generate a phase adjusted receive clock that is adjusted or calibrated in accordance with the memory device from which data is being received. In some embodiments, operation of the clock calibrator 565 is disabled when the directional mode is bidirectional in order to reduce power usage.

The clocking multiplexor 570 is configured to transmit either the phase adjusted clock transmitted by the clock calibrator 565 or a data strobe transmitted over the DS lead 170. The output of the clocking multiplexor 570 may be called a clock signal or reference signal, even though in some circumstances this signal may be derived from the received data strobe. The selection of the signal output by the clocking multiplexor 570 is controlled by the mode register 510, which as stated above outputs a directional mode to the clocking multiplexor 570. The output of the clocking multiplexor 570 is transmitted to the input buffer 397, which as stated above is enabled by the read indicator 396 and connected to the data-in register 395. The data received by the data-in register 395 is, therefore, clocked by either the adjusted clock produced by the clock calibrator 565 or the data strobe transmitted over the DS lead 170. The clocking multiplexor 570 transmits the data strobe transmitted over the DS lead 170 to the input buffer 397 when the controller 110 is configured to operate in a bidirectional mode. Additionally, the clocking multiplexor 570 transmits the adjusted clock produced by the clock calibrator 565 to the input buffer 397 when the controller 110 is configured to operate in a unidirectional mode.

When the controller 110 is configured to use the DS leads in a bidirectional manner, therefore, the data strobe may be used by the controller 110 to sample data transmitted by a DRAM. But when configured to operate in a unidirectional manner, the capture of read data by the controller 110 is timed or clocked with a calibrated internal timing reference (e.g., the adjusted clock).

DRAM with Directional Mode Control

Figure 3:
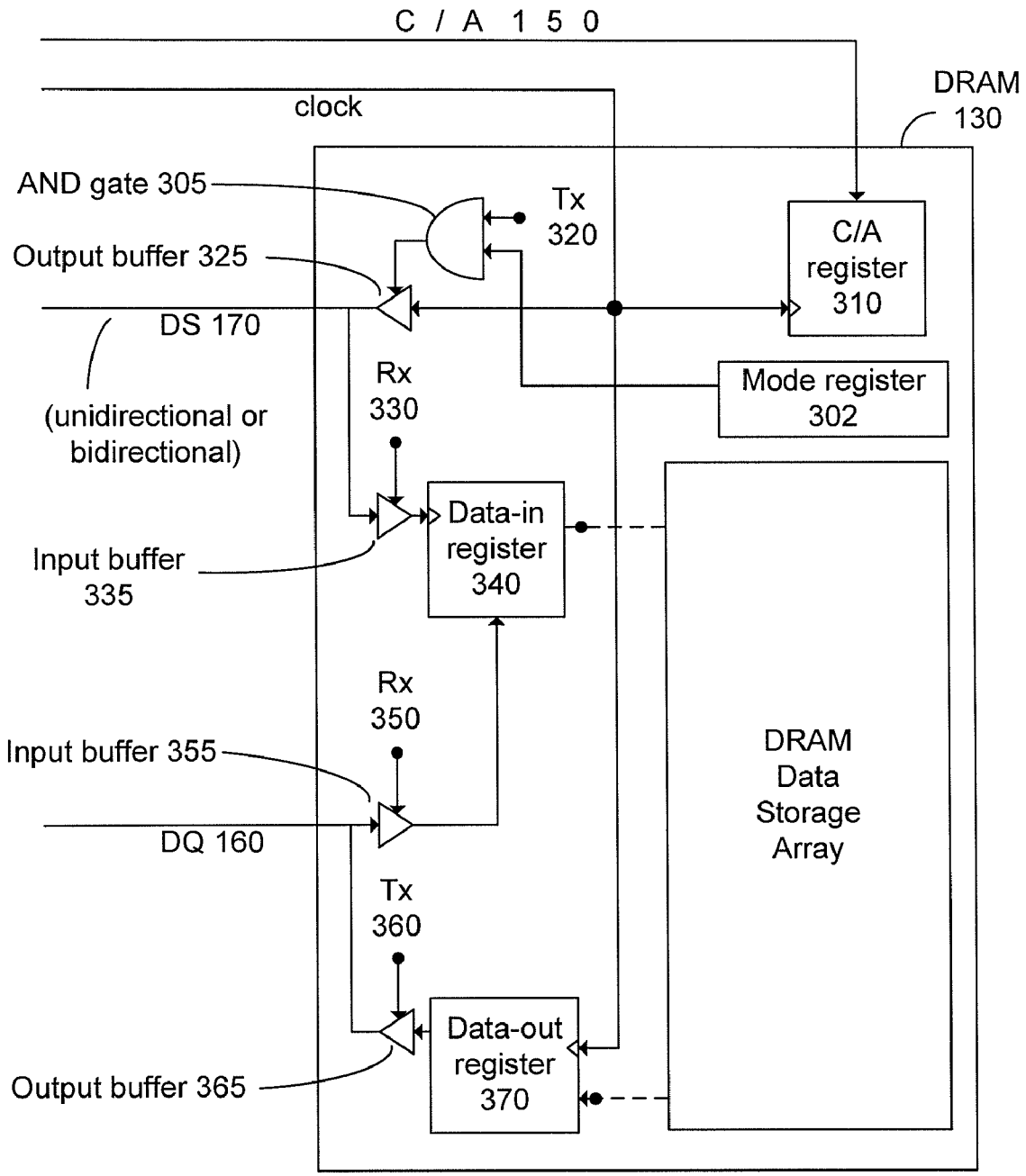
FIG. 3 illustrates a DRAM that may be included in the memory system illustrated in FIG. 1.

FIG. 3 illustrates a DRAM 130 of the memory system 100. As illustrated in FIG. 3, the DRAM 130 includes a mode register 302, C/A register 310, a transmit (Tx) indicator 320, an output buffer 325, a receive (Rx) indicator 330, an input buffer 335, a data-in register 340, a receive indicator 350, an input buffer 355, a transmit (Tx) indicator 360, an output buffer 365, a data-out register 370 and an AND gate 304. In some embodiments, the two receive indicators 330 and 350 are the same receive control signal, and the two transmit indicators 320 and 360 are the same transmit control signal. Furthermore, the receive and transmit indicators may be complements of each other.

It is noted that FIG. 3 is a conceptual representation of a small subset of the components of a DRAM chip. For instance, the data in and data out registers 340, 370 shown in this Figure represent circuitry in the interface to the storage array of the DRAM, such as in the sense amplifier arrays of the DRAM, and that circuit may or may not strictly meet the definition of "registers" (as opposed, for instance, to latches and other clocked circuits). Furthermore, the data in and data out registers 340, 370, while shown separately in FIG. 3, may be implemented in part or in whole with the same circuitry.

The C/A register 310 receives a clock (typically from the PLL clock buffer 144, FIG. 1) and control and address signals, via the C/A lead 150, from the controller 110. The clock clocks or times the receipt of these control and address signals.

The first set of input and output buffers 335, 325 are connected to a DS lead 170 to receive and transmit, respectively, a data strobe. As illustrated, the data strobe transmitted by the output buffer 325 is generated by the DRAM 130 from the clock.

Figure 4:
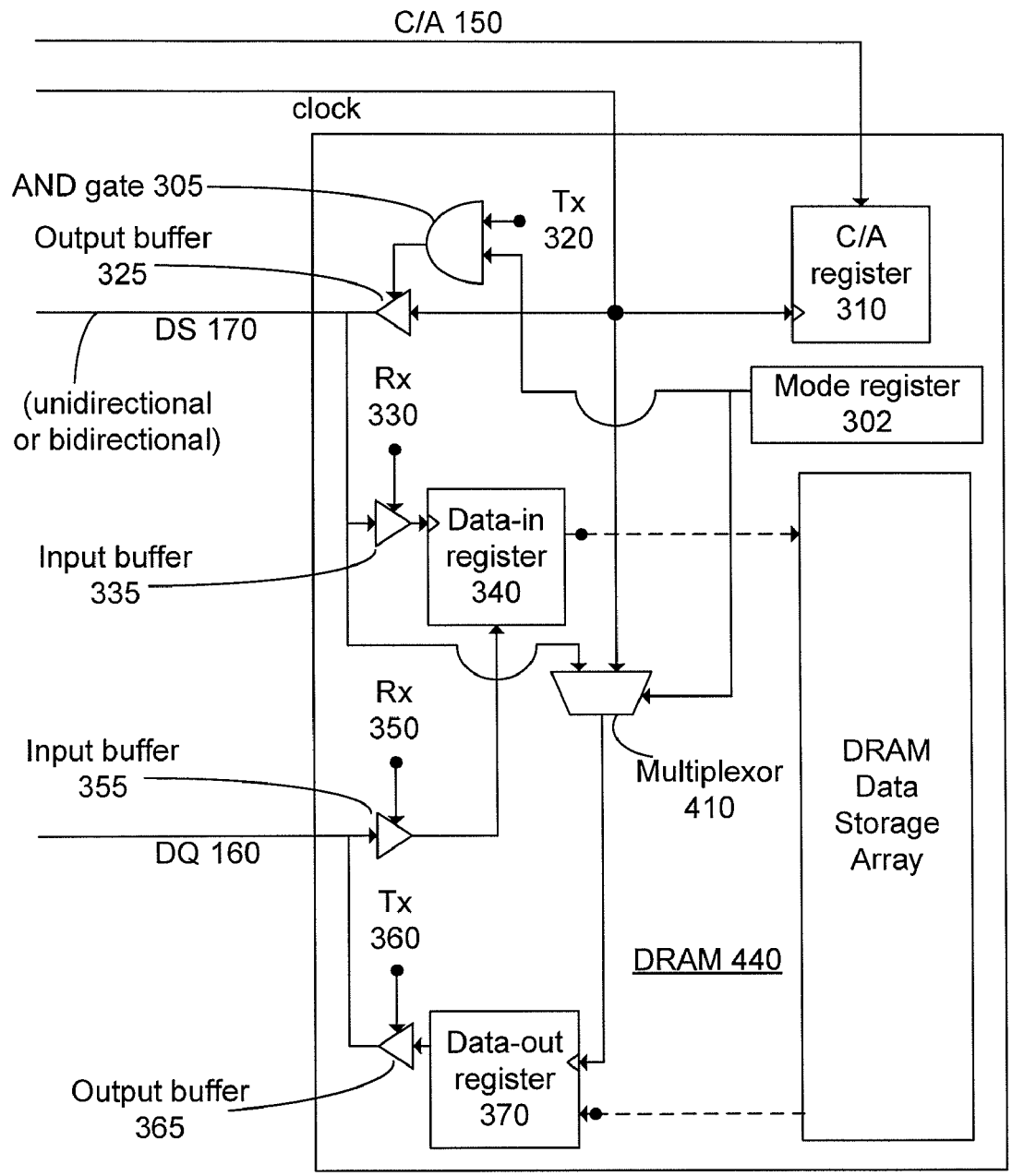
FIG. 4 illustrates another DRAM that may be included in the memory system illustrated in FIG. 1.

The DRAM mode register 302 stores a directional mode when used in conjunction with the DRAM 130 (or the DRAM 440 of FIG. 4). The directional mode determines whether the DS leads 170 are unidirectional or bidirectional. The mode register 302 may preferably be set during operation of the DRAM 130 by the controller 110 or during the manufacture of the DRAM 130 or memory module 120. In some embodiments, the controller 110 and DRAM 130 are configured so that the controller may send a command over the control and address lines 150 that directs the DRAM to store a particular mode value in the mode register 302. The directional mode stored by the mode register 302 is transmitted to the AND gate 305.

The AND gate 305, as indicated in the preceding paragraph, receives input from the DRAM mode register 302. The AND gate 305 also receives input from the transmit (Tx) indicator 320. The output of the AND gate 305 is high if the directional mode is high and the transmit (Tx) indicator 320 is high. Preferably, the transmit (Tx) indicator 320 and the directional mode are high when the DRAM 130 transmits a data strobe to the controller and the DRAM 130 is configured to operate in a bidirectional mode. The output of the AND gate 305 is connected to the output buffer 325 to enable or disable the output buffer 325. So when the DRAM 130 transmits data and, in addition, the DRAM 130 is configured to operate in a bidirectional mode, the output buffer 325 is enabled and drives the received clock signal onto the DS lead 170 as the data strobe for the data being transmitted from the data out register 370. Conversely, when the DRAM 130 is configured to operate in a unidirectional mode, the output of the AND gate 305 is low such that the output buffer 325 is disabled. When the output buffer 325 is not enabled, its output is tristated (i.e., set to a high impedance state), which leaves the DS lead 170 floating if no other device is asserting a signal on the DS lead, and more generally allows the DS lead 170 to be driven by another device (e.g., the memory controller 110, or another memory device in another memory module on the same memory bus as the memory module 120 in which the DRAM 130 resides).

The data strobe received by the input buffer 335 is generated and transmitted by the controller 110. Additionally, the input buffer 335 is enabled (or set to transmit a data strobe from the DS lead 170 to the data-in register 340) by the receive (Rx) indicator 330. Thus, when the DRAM receives data from the controller 110, the receive (Rx) indicator 330 is set so that the input buffer 335 is enabled. The receipt of data by the data-in register 340 is clocked, therefore, by the data strobe received over the DS lead 170.

The second set of input and output buffers 355, 365 is connected to a data signal (DQ) lead 160 to receive and transmit, respectively, data. As illustrated in FIG. 3, the data transmitted by the output buffer 365 is transmitted from the data-out register 370, which receives data from storage elements within the DRAM 130. Additionally, the output buffer 365 is enabled (or set to transmit data to the DQ lead 160) by the transmit (Tx) indicator 360. Thus, when the DRAM transmits data to the controller 110, the transmit (Tx) indicator 360 is set so that the output buffer 365 is enabled. The data received by the input buffer 355 is transmitted by the controller 110. Additionally, the input buffer 355 is enabled to transmit data from the DQ lead 160 to the data-in register 340, which transmits data to storage elements within the DRAM 130, by the receive (Rx) indicator 350. Thus, when the DRAM receives data from the controller 110, the receive (Rx) indicator 350 is set so that the input buffer 355 is enabled. The transmission of data by the data-out register 370 is clocked, therefore, by the clock (not the data strobe received over the DS lead 170).

As indicated above, when the DRAM 130 is configured to use the DS leads in a bidirectional manner, the data strobe is source synchronous and is driven by the DRAM 130 while the DRAM 130 transmits data. The transmission delays associated with the strobe output buffer 325 and the data output buffer 365 are preferably the same, or very close to being the same. As a result, the phase relationship of the transmitted data and data strobe will be preserved when those signals arrive at the controller. In this mode, the DRAM 130 is compatible with conventional controllers (e.g., controller 110, FIG. 1). But when the DRAM 130 is configured to use the DS leads in a unidirectional manner, the data strobe is not source synchronous and is not driven by the DRAM. In this mode, the DRAM 130 is compatible with controllers described herein (e.g., controllers with calibrated timing to receive data from the DRAM 130).

FIG. 4 illustrates another embodiment of a DRAM 440 of the memory system 100. In addition to those components described above in connection with the DRAM 130 illustrated in FIG. 3, the DRAM 440 illustrated in FIG. 4 includes a multiplexor 410.

The multiplexor 410 receives the clock (typically from the PLL clock buffer 144) and a data strobe transmitted by the DS lead 170. The output of the multiplexor is transmitted to the data-out register 370. So depending on the selection by the multiplexor 410, the output of data by the data-out buffer is timed or clocked by the clock or the data strobe transmitted by the DS lead 170. This selection is made by the mode register 302, which transmits the directional mode as selection input to the multiplexor 410.

As indicated above, when the DRAM 440 is configured to use the DS leads 170 in a unidirectional manner, the data output by the DRAM 440 is clocked by the data strobe generated by a controller (e.g., controller 110). This is possible because the data strobe is always transmitted by the controller. Additionally, the data strobe typically suffers from less phase shift than the clock, and as a result the rate of data transmission over the memory bus may be increased over that of prior systems. In this mode, the DRAM 440 is compatible with controllers (such as the controllers described herein) configured to continuously transmit a data strobe to the DRAM 440. But when the DRAM 440 is configured to use the DS leads 170 in a bidirectional manner, the data strobe is not available while the DRAM 440 transmits data. Instead, the data output by the DRAM 440 is clocked by the clock. In this mode, the DRAM 440 is compatible with conventional controllers (e.g., controller 110).

Additional Embodiments

Figure 5A:
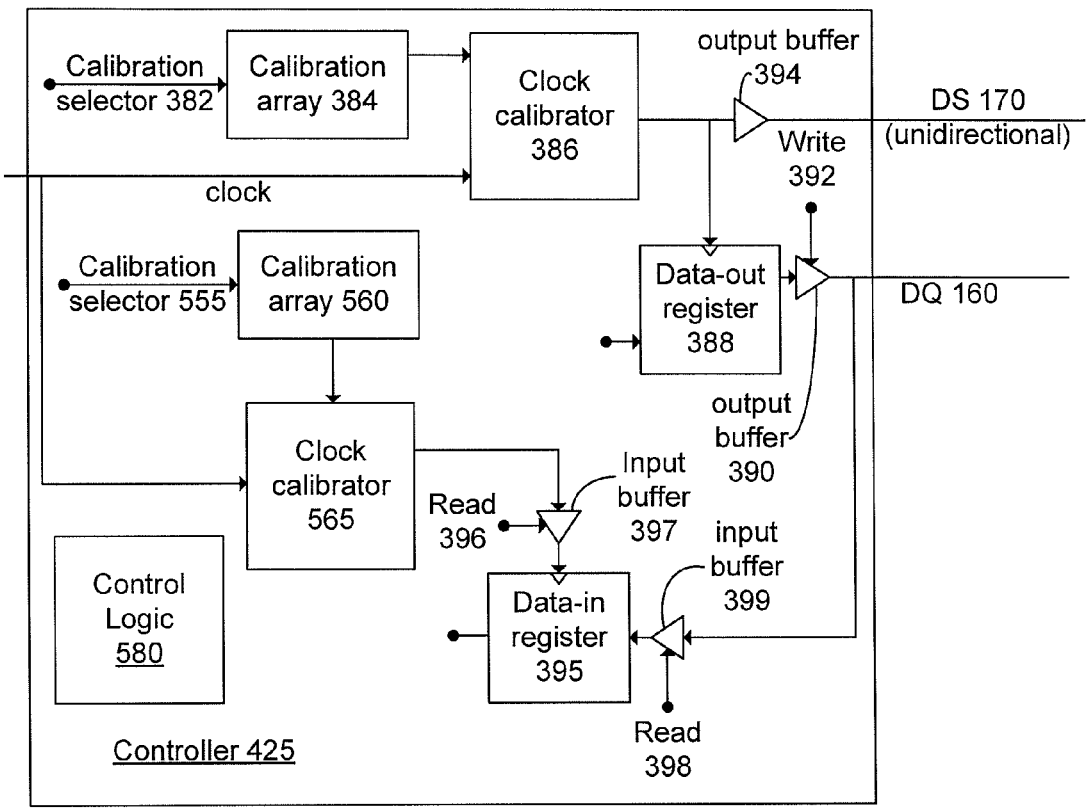
FIG. 5A illustrates another controller that may be included in the memory system illustrated in FIG. 1.

FIG. 5A illustrates another embodiment of a controller 425 for use in the memory system 100. Unlike the controller 110 illustrated in FIG. 2, the controller 425 illustrated in FIG. 5A does not operate in bidirectional mode. Accordingly, this controller 425 does not include a mode register 510, a write indicator 380, an OR gate 515, or a clocking multiplexor 570. These components are not needed because the output of the clock calibrator 386 is continuously applied to the DS lead 170. Alternately, the controller may include a mode register that stores various mode values, but not a directional mode value.

Optionally, this embodiment of the controller 425 includes data strobe output buffer 394, to provide a signal delay that matches, or approximately matches, the transmission delay associate with data-out register 388 and output buffer 390. Additionally, input to the data-in register is always clocked by the output of the clock calibrator 565. This controller 425 is compatible with the DRAMs described herein (e.g., DRAM 130, DRAM 440, and DRAM 450), but is not compatible with conventional DRAMs.

Figure 5B:
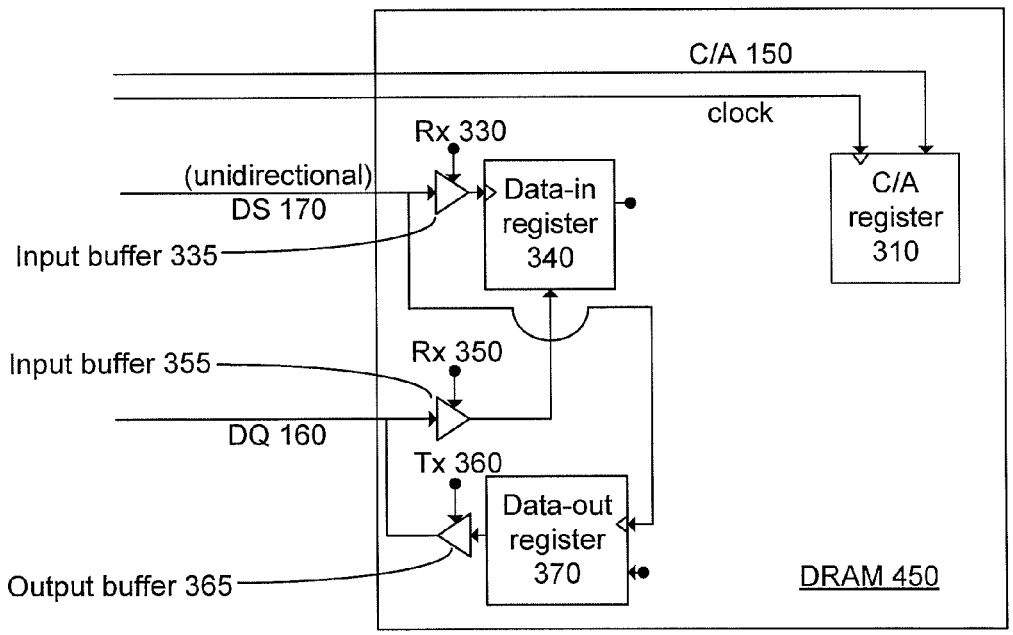
FIG. 5B illustrates another DRAM that may be included in the memory system illustrated in FIG. 1.

FIG. 5B illustrates another embodiment of a DRAM 450 for use in the memory system 100. Unlike the DRAMs 130, 440 of FIGS. 3 and 4, this DRAM 450 does not include an AND gate 305 or an output buffer 325. This is because this DRAM 450 does not transmit a data strobe over the DS lead 170. Additionally, this DRAM 450 does not include a multiplexor 410 because the output of the data-out register 370 is not clocked or timed by the clock. Instead, the data-out register 370, like the data-in register 340, is always clocked by a data strobe transmitted over the DS lead 170. Preferably, only control and address signals transmitted over the C/A lead 150 are clocked by the clock. This DRAM 450 is compatible with controllers described herein (e.g., controller 110 and controller 425), but is not compatible with conventional controllers.

The foregoing descriptions of specific embodiments are presented for purposes of illustration and explanation. The embodiments were chosen and described in order to best explain the principles of the invention and its practical applications, to thereby enable others skilled in the art to best utilize the invention. They are not intended to be exhaustive or to limit the invention to the precise forms disclosed. Various modifications may occur to those skilled in the art having the benefit of this disclosure without departing from the inventive concepts described herein.

For example, the various data strobes and clocks (i.e., clock signals) described above are illustrated as single ended signals. In alternate embodiments, however, these data strobes and clocks are differential signals. The use of differential signals enables greater clock speeds and data rates. Accordingly, it is the claims, not merely the foregoing illustration, that are intended to define the exclusive rights of the invention.

What is claimed is:

1. A memory controller, comprising;
a first interface to transmit control and address signals to a memory device synchronously with respect to a first clock signal that is transmitted to the memory device;
wherein:
in a first mode of operation, the memory controller is configured to transmit a data strobe during write operations and to disable transmission of the data strobe from the memory controller during read operations, the data strobe being distinct from the first clock signal and transmitted while the first clock signal is transmitted to the memory device; and
in a second mode of operation, the memory controller is configured to transmit a second clock signal to the memory device during both write and read operations, the second clock signal being distinct from the first clock signal and transmitted while the first clock signal is transmitted to the memory device.

2. The memory controller of claim 1, wherein:
in the first mode of operation, the data strobe is to be transmitted synchronously with first write data for use by the memory device to sample the first write data during the write operations; and
in the second mode of operation, the second clock signal is to be transmitted synchronously with second write data for use by the memory device to sample the second write data during the write operations and to transmit read data during the read operations.

3. The memory controller of claim 1, wherein in the first mode of operation, the memory controller is configured to transmit the data strobe only during the write operations.

4. The memory controller of claim 1, wherein in the second mode of operation, the memory controller is configured to transmit the second clock signal continuously to the memory device.

5. The memory controller of claim 1, further comprising a register to store information indicating one of the first and second modes in which the memory controller operates.

6. The memory controller of claim 1, further comprising a second interface having a signal output, wherein the second interface is configured to transmit the data strobe via the signal output during the write operations in the first mode of operation and to transmit the second clock signal via the signal output during both read and write operations in the second mode of operation.

7. The memory controller of claim 6, wherein the second interface comprises:
an output buffer to transmit the data strobe during the write operations in the first mode of operation and the second clock signal during both the read and write operations in the second mode of operation.

8. The memory controller of claim 7, wherein the output buffer is configured to tristate the signal output during the read operations in the first mode of operation.

9. The memory controller of claim 7, further comprising:
a logic gate, coupled to the output buffer, to enable the output buffer to transmit the data strobe during the write operations in the first mode of operation, to disable the output buffer during the read operations in the first mode of operation, and to enable the output buffer to transmit the second clock signal during both the read and write operations in the second mode of operation.

10. The memory controller of claim 9, further comprising a register, coupled to the logic gate, to provide to the logic gate an indication of whether the memory controller is operating in the first or second mode of operation.

11. The memory controller of claim 6, further comprising:
a clock calibrator to adjust a phase of a third clock signal and to provide the phase-adjusted third clock signal to the second interface,
wherein the second interface is configured to transmit the data strobe and the second clock signal based on the phase-adjusted third clock signal.

12. The memory controller of claim 11, further comprising an output register, coupled to the clock calibrator, to transmit data during the write operations in the first and second modes of operation.

13. The memory controller of claim 12, wherein the clock calibrator is configured to provide the phase-adjusted third clock signal to the output register to clock transmission of data during write operations.

14. The memory controller of claim 7, wherein the data strobe to be transmitted during the write operations in the first mode of operation is a first data strobe, the memory controller further comprising:
an input buffer to receive a second data strobe during the read operations in the first mode of operation; and
an input register to receive data during the read operations in the first mode of operation, wherein the input register is configured to use the second data strobe to sample the data during the read operations in the first mode of operation.

15. The memory controller of claim 14, wherein the input buffer is configured to provide the second data strobe to the input register to sample the data during the read operations in the first mode of operation.

16. The memory controller of claim 14, wherein:
the input register is configured to receive data during the read operations in the second mode of operation; and
the memory controller further comprises a clock calibrator to adjust a phase of a third clock signal and to provide the phase-adjusted third clock signal to the input register to sample data during the read operations in the second mode of operation.

17. The memory controller of claim 14, wherein the output buffer and the input buffer are coupled to an external lead during the first mode of operation and wherein:
the output buffer is configured to transmit the first data strobe via the external lead during the write operations in the first mode of operation; and
the input buffer is configured to receive the second data strobe from the external lead during the read operations in the first mode of operation.

18. The memory controller of claim 1, wherein the first clock signal is transmitted to the memory device via a phase-locked loop.

19. A method of operating a memory controller, comprising:
setting a mode of operation of the memory controller to a first mode of operation or a second mode of operation;
transmitting control and address signals from the memory controller to a memory device synchronously with respect to a first clock signal that is transmitted to the memory device; and
in the first mode of operation, transmitting from the memory controller a timing signal as a data strobe to the memory device during write operations and disabling transmission of the timing signal from the memory controller during read operations, the data strobe being distinct from the first clock signal and transmitted while the first clock signal is transmitted to the memory device; and
in the second mode of operation, transmitting from the memory controller a second clock signal to the memory device during both write and read operations, the second clock signal being distinct from the first clock signal and transmitted while the first clock signal is transmitted to the memory device.

20. The method of claim 19, wherein transmitting the timing signal comprises transmitting the timing signal via an interface; and wherein transmitting the second clock signal comprises transmitting the second clock signal via the interface.

21. The method of claim 19, wherein:
in the first mode of operation, the timing signal is transmitted synchronously with first write data for use by the memory device to sample the first write data during the write operations; and in the second mode of operation, the second clock signal is transmitted to the memory device for use by the memory device to sample second write data during the write operations and to transmit read data during the read operations, wherein the second clock signal is transmitted synchronously with the second write data during the write operations.

22. The method of claim 19, comprising:
in the first mode of operation, the timing signal is transmitted to the first memory device only during write operations; and
in the second mode of operation, the second clock signal is transmitted continuously.

23. The method of claim 19, further comprising:
in a register, storing information indicating the mode of operation of the memory controller.

24. The method of claim 19, wherein the controller includes an interface having an output and wherein:
in the first mode of operation, the timing signal is transmitted by the interface via the output during the write operations; and
in the second mode of operation, the second clock signal is transmitted by the interface via the output during both the read and write operations.

25. The method of claim 24, wherein the interface includes an output buffer and:
transmitting the timing signal comprises outputting the timing signal using the output buffer; and
transmitting the second clock signal comprises outputting the second clock signal using the output buffer.

26. The method of claim 25, further comprising tristating an output of the output buffer during the read operations if the first mode of operation is selected.

27. The method of claim 24, further comprising adjusting a phase of a third clock signal, wherein:
in the first mode of operation, transmission of the timing signal is based on the phase-adjusted third clock signal; and
in the second mode of operation, transmission of the second clock signal is based on the phase-adjusted third clock signal.

28. The method of claim 27, wherein the interface includes an output buffer, the method further comprising providing the phase-adjusted third clock signal to the output buffer to be transmitted as the timing signal when in the first mode of operation and the second clock signal when in the second mode of operation.

29. The method of claim 27, further comprising transmitting data from an output register during the write operations, using the phase-adjusted third clock signal.

30. The method of claim 29, further comprising providing the phase-adjusted third clock signal to the output register to clock transmission of the data from the output register.

31. The method of claim 24, wherein the timing signal transmitted from the output buffer during the write operations in the first mode of operation is a first data strobe, the method further comprising:
in the first mode of operation:
receiving a second data strobe at an input buffer during the read operations; and
sampling data at an input register during the read operations using the second data strobe.

32. The method of claim 19, further comprising:
in the second mode of operation:
adjusting a phase of a third clock signal; and
sampling data at an input register using the phase-adjusted third clock signal during the read operations.

33. The method of claim 19, wherein the first clock signal is transmitted to the memory device via a phase-locked loop.

34. A memory controller, comprising:
an interface to transmit, to a memory device, address information and a transfer command that is one of a write command or a read command, wherein the address information and the transfer command are transmitted synchronously with respect to a first clock signal that is transmitted to the memory device;
first circuitry to transmit write data on a data bus to the memory device when the transfer command is a write command;
second circuitry to receive read data on the data bus from the memory device when the transfer command is a read command;
third circuitry configured to transmit while the first clock signal is transmitted to the memory device:
when in a first mode and when the transfer command is a write command, a first data strobe on a data strobe line to the memory device, wherein the memory device uses the first data strobe to sample the write data; and,
when in a second mode, a continuously running second clock signal to the memory device, wherein, when the transfer command is a write command, the memory device uses the second clock to sample the write data and, when the transfer command is a read command, the memory device uses the second clock to transmit the read data; and
fourth circuitry configured to receive data on the data bus from the memory device when in the first mode and when the transfer command is a read command, a second data strobe on the data strobe line from the memory device, wherein the fourth circuitry uses the second data strobe to sample the read data.

35. The memory controller of claim 34, wherein the third circuitry is configured to transmit, when in the second mode, the second clock signal on the data strobe line.

36. The memory controller of claim 34, wherein the first clock signal is transmitted to the memory device via a phase-locked loop.

37. A memory controller, comprising:
an interface to transmit to a memory device address information and a transfer command that is one of a write command or a read command wherein the address information and the transfer command are transmitted synchronously with respect to a first clock signal that is transmitted to the memory device;
first circuitry to transmit write data on a data bus when the transfer command is a write command;
second circuitry to receive read data on the data bus when the transfer command is a read command;
third circuitry configured to transmit, when in a first mode and when the transfer command is a write command, a first data strobe on a data strobe line, the first data strobe being distinct from the first clock signal and transmitted while the first clock signal is transmitted to the memory device; and, when in a second mode, a continuously running second clock signal, the second clock signal being distinct from the first clock signal and transmitted while the first clock signal is transmitted to the memory device; and
fourth circuitry configured to receive data on the data bus when in the first mode and when the transfer command is a read command, a second data strobe on the data strobe line, wherein the fourth circuitry uses the second data strobe to sample the read data.

38. The memory controller of claim 37, wherein the third circuitry is configured to transmit, when in the second mode, the second clock signal on the data strobe line.

39. The memory controller of claim 37, wherein the first clock signal is transmitted to the memory device via a phase-locked loop.

40. A memory controller, comprising:

a first interface circuit to transmit control and address signals to a memory device synchronously with respect to a first clock signal that is transmitted to the memory device, wherein the first interface circuit is configurable to operate in one of a first mode of operation and a second mode of operation, wherein, in the first mode of operation, the first interface circuit is configured to transmit a first timing signal, distinct from the first clock signal, as a write strobe when the controller is performing a write operation and to be disabled from transmitting the first timing signal when the controller is performing read operations, and wherein in the second mode of operation, the first interface circuit is configured to transmit a second timing signal as a free-running second clock signal during both read and write operations, the second clock signal being distinct from the first clock signal and transmitted while the first clock signal is transmitted to the memory device; and a second interface circuit to transmit a data signal along with one of the first timing signal and the second timing signal during a write operation.

41. The memory controller of claim 40, further comprising a register to store a mode setting indicating whether the controller is to operate in the first or the second mode of operation, and wherein the first interface is configured based on the mode setting.

42. The memory controller of claim 40, wherein the first and second timing signals are derived from a clock signal, and wherein the controller is to transmit command/address signals synchronously with the clock signal.

43. The memory controller of claim 40, wherein the first interface circuit has a signal output to transmit the first timing signal and the second timing signal.

44. The memory controller of claim 40, wherein the first interface circuit includes an output buffer to transmit the first and second timing signals.

45. The memory controller of claim 44, wherein the output buffer has an output and wherein the output buffer is to tristate the output during read operations when the first interface circuit is in the first mode of operation.

46. The memory controller of claim 40, wherein the first clock signal is transmitted to the memory device via a phase-locked loop.

* * * * *